James V. Fusco
Samuel B. Robison
Alfred L. Miller

Inventors

By R.D. Manahan  Attorney

June 11, 1963  J. V. FUSCO ET AL  3,093,613
VULCANIZATION OF SYNTHETIC RUBBER WITH
POLYHALOMETHYL PHENOL SUBSTANCES
Filed June 12, 1957  2 Sheets-Sheet 2

James V. Fusco
Samuel B. Robison   Inventors
Alfred L. Miller

By R. D. Manahan  Attorney

United States Patent Office 3,093,613
Patented June 11, 1963

3,093,613
VULCANIZATION OF SYNTHETIC RUBBER WITH POLYHALOMETHYL PHENOL SUBSTANCES
James V. Fusco, Westfield, Samuel B. Robison, Roselle, and Alfred L. Miller, Cranford, N.J., assignors to Esso Research and Engineering Company, a corporation of Delaware
Filed June 12, 1957, Ser. No. 665,246
12 Claims. (Cl. 260—38)

The present invention relates to the vulcanization of synthetic rubbery polymers with halomethyl phenol substances. More specifically, it concerns the vulcanization of butyl rubber with halomethyl hydrocarbon-substituted phenol substances.

Heretofore, butyl rubber has been successfully used for a number of years in the manufacture of inner tubes, window channels, curing bladders and inner liners for tubeless tires. While it has many characteristics which differ from the other so-called synthetic rubbers, its distinguishing property is its low unsaturation. While this property is very desirable from the standpoint of thermal stability and resistance to weathering, it is sometimes a drawback, especially with regard to butyl's vulcanization rate.

It has now been discovered that butyl rubber can be cured in a shorter time and at lower temperatures with the aid of polyhalomethyl phenol substances.

The invention will be best understood from the following description in which reference will be made to the drawings.

Figure 1:
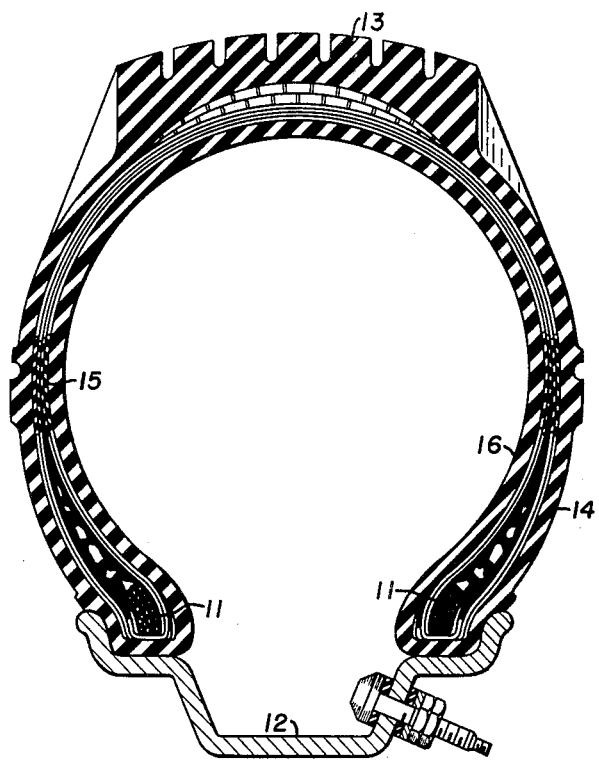
FIGURE 1 is a vertical section of a pneumatic tubeless tire.

All of the foregoing articles contain butyl rubber which has been cured with the halomethyl phenol substances in the manner described hereafter.

According to the present invention, butyl rubber is cured with a halomethyl hydrocarbon-substituted phenolic substance, which may be either in a monomeric or polymeric form, at elevated temperatures to produce vulcanizates having outstanding physical and dynamic properties. It is generally desirable to have a polyvalent metal compound, such as zinc oxide, present when the butyl is cured to assist the vulcanization.

Butyl rubber or GR-I (Government rubber-isobutylene) contains about 85–99.5% (preferably about 95–99.5%) of a $C_4$–$C_7$ isoolefin, such as isobutylene with about 15 to 0.5% (preferably about 5 to 0.5 wt. percent) of a multiolefin of about 4–14, preferably 4–8, carbon atoms. The expression "butyl rubber" as employed in the specification and claims, is intended to include copolymers having about 90–99.5% by weight of an isoolefin of about 4–7 carbon atoms and about 10 to 0.5% by weight of a conjugated multiolefin of about 4–10 carbon atoms. The preparation of butyl type rubbers is described in U.S. Patent 2,356,128. In general, the rubber comprises the reaction product of a $C_4$–$C_7$ isoolefin, preferably isobutylene with a $C_4$–$C_{10}$, preferably a $C_4$–$C_6$, conjugated diolefin such as isoprene, butadiene, dimethyl butadiene, piperylene, etc. The product of isobutylene and isoprene is preferred.

The halomethyl hydrocarbon-substituted phenol curing agents used in the present invention may be obtained by halogenating polymethylol phenols, such as 2,6-dimethylol para-substituted phenols, either in the monomeric or polymeric form, so as to at least partially substitute halogen for the hydroxyl portion of the methylol groups. The halogenation may be carried out at temperatures ranging between about 0 and 150° C., but preferably from 20 to 80° C. using an appropriate halogenating agent. Among the halogenating agents which have been found suitable for the purposes of the present invention are gaseous hydrogen fluoride, hydrogen chloride, hydrogen bromide, hydrogen iodide, or solutions thereof, gaseous chlorine, liquid bromine, alkali metal hypochlorites or hypobromites, concentrated aqueous hydrogen iodine solutions, $C_4$ to $C_{10}$ tertiary alkyl hypochlorites, sulfur bromides, sulfuryl chloride, pyridinium chloride perchloride, N-bromosuccinimide, alpha-chloroacetoacetanilide, N,N'-dichloro-5,5-dimethylhydantoin, iodine halides, trichlorophenol chloride, N-chloroacetamide, beta-bromo-methyl phthalimide, etc. The preferred halogenating agents are gaseous hydrogen fluoride, hydrogen chloride, hydrogen bromide, hydrogen iodide, chlorine and substances which form hydrogen halide under reaction conditions, such as liquid bromine.

Generally the polymethylol compound or resin which is to be halogenated is dissolved in a substantially inert organic solvent, such as hexane, benzene, chloroform, or carbon tetrachloride, to form a 20 to 50 wt. percent solution which is then contacted with a halogenating agent according to conventional techniques for a period ranging from a few minutes up to several days, depending upon the reactivity of the specific halogenating agent. The amount of halogenating agent employed will vary according to the amount of halogen which is to be incorporated in the polymethylol substance. For instance, if one wishes to substitute halogen for both hydroxyl groups in the ortho position of 2,6-dimethylol octyl phenol, he should react 2 moles of hydrogen chloride with each mole of a dimethylol phenol compound. In some instances it may be desirable to use more or less than this amount of halogenating agent depending on whether or not the polymethylol substance is monomeric or polymeric. Thus, one mole of a polymethylol phenol substance may be reacted with as little as 0.3 mole or as much as 4 moles of halogenating agent. The halogenated polymethylol hydrocarbon-substituted phenol can contain from 1 to 60 wt. percent of combined halogen but, for most purposes, it is not necessary to put more than about 30 wt. percent of combined halogen into the polymethylol compound to obtain a product having the wanted properties. Furthermore, the halogen content of the polymethylol phenol condensate will vary according to the particular halogen. For example, while the preferred chlorine or bromine content is between about 2 and 16 wt.

percent, the preferred iodine content is between about 5 and 30 wt. percent of the condensate.

The halomethyl hydrocarbon-substituted phenols coming within the purview of the present invention are those which have a hydrocarbon group in the meta or para position. The phenol portion may be either monohydric or polyhydric. The monomeric form of these curing agents falls under the following general formula:

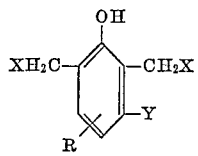

wherein R is an alkyl, aryl, or alkaryl hydrocarbon containing 4 to 16 carbon atoms located in the meta or para position (4–5 position); X is a halogen such as fluorine, chlorine, bromine, or iodine; and Y is hydrogen or hydroxy.

Among the compounds coming under this general formula are 2,6-dichloromethyl-4-tertiarybutyl phenol, 2,6-dichloromethyl-4-octyl phenol, 2,6-diiodomethyl-4-dodecyl phenol, 2,6-dichloromethyl-4-phenyl phenol, 2,6-dibromomethyl-5-pentadecyl phenol, 2,6-dibromomethyl-5-pentadecyl resorcinol and 2,6-dibromomethyl-4-cumyl phenol. If desired, these compounds may be blended with polymethylol compounds or resins to obtain a composition having the desired curing rate.

Also, products obtained by the controlled halogenation of methylol containing resins prepared by the condensation of an aldehyde, for example, formaldehyde, with the following representative substituted phenols: 4-tertiarybutyl phenol, 4-octyl phenol, 4-dodecyl phenol, 4-phenyl phenol, 4-monoxy phenol, 4-hydroxydiphenyl methane, 2-bis-(4-hydroxy phenyl) propane, and 5-pentadecyl phenol, and mixtures thereof may be used directly to cure butyl rubber or they may be blended with non-halogenated methylol-containing resin to obtain the wanted reactivity.

The polymethylolhydrocarbon-substituted phenols that are halogenated according to the present invention can be prepared by reacting a substituted phenol having the two ortho positions unoccupied with a molar excess of an aldehyde. For instance, 2 moles of formaldehyde may be reacted with a mole of phenol compound in the presence of a strong alkaline catalyst, such as an alkali metal hydroxide, at a temperature between about 25 and 100° C. The 2,6-dimethylol phenol compound formed in this manner may be neutralized and isolated by acidification of the mixture and separation of the oily layer. If desired, the monomer may be polymerized by heating at elevated temperatures, e.g., 75 to 175° C. The polymer should be oil soluble and heat reactive. Suitable methods for the preparation of para-substituted dimethylol phenol compounds are described by Honel in U.S. Patent 1,996,069 and Charlton et al. in U.S. Patent 2,364,192. Alternately, the methylhalo hydrocarbon-substituted phenols may be made directly by condensing the phenol and aldehyde in the presence of a hydrogen halide or a hydrogen halide-forming substance.

A preferred embodiment of the invention involves the use of polyvalent metal compounds which serve to assist the vulcanization. Among the compounds which have been found to be especially suitable are groups II and IV metal compounds such as magnesium oxide, zinc stearate, zinc carbonate, zinc oxide, zinc chloride, magnesium stearate, calcium oxide, calcium stearate, lead oxide, lead stearate, etc. Generally, these compounds should be used in an amount between about 1 and 30 parts by weight per 100 parts by weight of rubber; however, it is preferred to use about 2 to 10 parts by weight of these compounds.

Because the curing agents are so highly reactive, it is now possible to cure butyl rubber at temperatures and rates which have heretofore been difficult to achieve. Thus, 100 parts by weight of butyl rubber which has been compounded with a minor amount, say about 2 to 30 parts by weight, of a halogenated curing agent and 3 to 15 parts by weight of a polyvalent metal compound may be cured in 2 hours at a temperature as low as 140° F., or in 10 minutes at a temperature as high as 400° F. The preferred curing conditions are between 40 mins. at 250° F. and 20 mins. at 350° F. Vulcanizates produced in this manner have excellent flexing properties and thermal stability as well as good stress-strain characteristics.

If desired, prior to vulcanization, the rubber may be compounded with from 20 to 200 parts by weight of filler per 100 parts by weight of rubber. Suitable fillers include such things as channel blacks, furnace blacks, clays, silicates, etc. Vulcanizates having outstanding physical and dynamic properties have been obtained with from 30 to 75 parts by weight of carbon black per 100 parts by weight of rubber.

The rubber may also be compounded with extender and processing oils which may boil from about 400 to 700° F. Generally, between about 3 to 30 parts by weight of oil is compounded with 100 parts by weight of rubber. In addition, there may also be a mold release compound, such as stearic acid, present.

Suitable recipes are as follows:

| Ingredient | Parts by weight, general | Parts by weight, preferred |
|---|---|---|
| Butyl rubber | 100 | 100 |
| Filler | 20–200 | 50–75 |
| Extender oil | 0–30 | 3–15 |
| Stearic acid | 0–35 | 1–3 |
| Metal compound | 1–30 | 2–10 |
| Halomethyl hydrocarbon-substituted phenol | 2–20 | 10–15 |

The butyl rubber vulcanizates prepared according to the present invention are suitable for use in any article which is subject to elevated temperatures and/or repeated flexing.

The following examples demonstrate the various embodiments of the invention in more detail. All concentrations are in parts by weight unless otherwise denoted.

EXAMPLE 1

A chlorinated resin was prepared by dissolving 300 gms. of Amberol ST–137 in 800 ml. of benzene and contacting it with anhydrous hydrogen chloride gas at 70° C. for 2 hours. The reaction product after stripping off the solvent under 200 mm. of mercury absolute pressure contained 10.16% chlorine and had a dark red color. Amberol ST–137 is a trade designation for a mixture of multicyclic dimethylol phenol believed to be made directly from one mole of para-octyl phenol, two moles of formaldehyde and one mole of sodium hydroxide, the alkali being carefully neutralized after the condensation is complete. It is a solid phenolic resin at room temperature and contains 79.75% carbon, 10.26% hydrogen, 9.11% oxygen and a methylol content of 6.5%.

Next, 150.5 parts by weight of the master batch were compounded with 5 parts of zinc oxide and 12 parts of either Amberol ST–137 or the chlorinated resin. Each recipe was then cured at 320° F. for 60 mins. and evaluated for stress-strain and flexing properties.

Table I

|  | Resin | Chloro-resin |
|---|---|---|
| Stress-strain properties: |  |  |
| Modulus at 200% | 250 | 935 |
| Modulus at 300% | 475 | 1,900 |
| Tensile strength, p.s.i. | 2,039 | 2,050 |
| Elongation, percent | 840 | 390 |
| Goodrich Flexometer data at 100° C., 30 cps., 0.25″ stroke, 89 p.s.i. load: |  |  |
| Percent permanent set | 14.4 | 1.7 |
| Percent dynamic drift | 3.1 | 0.0 |
| Temp. rise, °C | 34 | 23 |
| Appearance of slug after flexing 30 mins | Good | Excellent |

While the resin cured butyl rubber had a good tensile strength, it was less desirable than the chloro-resin cured butyl in some of the other properties. The enhanced activity of the halogen-modified resins is demonstrated by the generally higher low extension moduli and improved flexometer data. In the flexometer test, which is an accepted method of testing vulcanizate permanence, low values for percent permanent set, percent dynamic drift and temperature rise are desirable. Degradation of the vulcanizate during flexing is generally noted by the generation of porosity in the center of the test specimen. The data illustrate that the halo-resin vulcanizate is outstanding in flexometer performance as well as moduli at 200 and 300%. These unexpected results clearly demonstrate the advantages of these halogenated curing agents.

EXAMPLE 2

A halomethyl hydrocarbon-substituted phenolic resin was prepared by injecting anhydrous hydrogen bromide gas through an agitated solution consisting of 800 ml. of benzene containing 300 gms. of dimethylol para-octyl phenol resin which was prepared by the alkaline catalyzed condensation of two moles of formaldehyde with one mole of para-octyl phenol. This resin, which is sold under the trade name SP-1045 by the Schenectady Varnish Co., was analyzed and found to contain 78.29% by weight carbon, 10.56% by weight hydrogen, 11.00% by weight oxygen, and to have a methylol content of 9.2% by weight (procedure described in Analytical Chemistry, vol. 23, No. 6, pages 883–884), as well as a calculated average molecular weight of 930. After adding the anhydrous hydrogen bromide gas to the solution at a rate of about 0.1 liter/minute for from 5 to 360 mins., the halogenated resin solution was filtered and the benzene removed by distillation under 200 mm. absolute pressure with a gradual increase in pot temperature from 25 to 100° C. The preparation of these resins and their properties is set forth in Table II;

Table II

RESIN PREPARATION—CONDITIONS OF REACTION WITH HYDROGEN BROMIDE GAS

| Resin No. | 1 | 2 | 3 | 4 | 5 | 6 | 7 | 8 |
|---|---|---|---|---|---|---|---|---|
| Reaction temperature, °C | (1) | (1) | (1) | (1) | (1) | (1) | 50 | 80 |
| Reaction time, min | 5 | 15 | 30 | 75 | 98 | 360 | 30 | 30 |
| Bromine content to resin, weight percent | 0.87 | 1.99 | 4.39 | 7.25 | 11.19 | 16.07 | 4.79 | 4.08 |
| Appearance at room temperature | (2) | (2) | (3) | (3) | (4) | (4) | (3) | (3) |

[1] Between 24 and 31° C.
[2] Hard light brown.
[3] Hard brown.
[4] Tacky dark brown.

Twelve parts by weight of each of these resins and 5 parts by weight of zinc oxide were compounded with 150.5 parts by weight of a butyl rubber master batch having the following recipe.

| Master batch: | Parts by weight |
|---|---|
| GRI-17 | 100 |
| HAF black | 25 |
| SRF black | 25 |
| Stearic acid | 0.5 |

The GRI-17 polymer was isobutylene-isoprene butyl rubber having a viscosity average molecular weight of 410,000, a 1.5 mole percent unsaturation and a Mooney viscosity at 212° F. of 66. The master batch, bromine-containing resins, and zinc oxide were press cured for 30 minutes at 307° F.

Table III contains the physical properties of the vulcanizates.

Table III

| Resin No | 1 | 2 | 3 | 4 | 5 | 6 | 7 | 8 |
|---|---|---|---|---|---|---|---|---|
| Modulus at 200%, p.s.i. |  | 170 | 550 | 640 | 1,020 | 1,450 | 525 | 550 |
| Modulus at 300%, p.s.i. | 200 | 370 | 1,020 | 1,200 | 1,780 |  | 925 | 975 |
| Tensile strength, p.s.i. | 990 | 2,040 | 2,040 | 1,960 | 1,960 | 2,030 | 1,930 | 2,050 |
| Elongation at break, percent | 870 | 870 | 570 | 490 | 350 | 320 | 580 | 630 |
| Goodrich Flexometer test,[1] 100° C. oven temp., 0.25 in. stroke, 1800 r.p.m., 89 p.s.i. load, 30 min. test duration: |  |  |  |  |  |  |  |  |
| Permanent set, percent | (2) | 29.6 | 7.4 | 3.8 | 2.7 | 2.5 | 7.8 |  |
| Dynamic drift, percent |  | 8.0 | 2.7 | 1.9 | 0.4 | 1.3 | 3.3 |  |
| Temperature rise, ° C |  | 43 | 26 | 30 | 22 | 28 | 28 |  |
| Appearance |  | (3) | (4) | (4) | (4) | (4) | (4) |  |

[1] Instrument description see ASTM Test D-623-52T.
[2] Too soft to test.
[3] Very porous.
[4] Excellent The data show that the optimum amount of bromine in the resin is between about 2 and 16%. The Mooney scorch data at 260° F. in Table IV demonstrate that the best processing characteristics are obtained when the resin contains between about 3 and 7% bromine.

Table IV

| Resin No | 1 | 2 | 3 | 4 | 5 | 6 | 7 | 8 |
|---|---|---|---|---|---|---|---|---|
| Mooney scorch at 260° F.: Small rotor, mins. to rise 5 points over minimum | >24 | >20 | 26 | 11 | 1 | 0.5 |  |  |

EXAMPLE 3

Example 2 was repeated except that anhydrous hydrogen chloride gas was used to halogenate the SP-1045 resin.

Table V.—Chlorine Containing Resins

RESIN PREPARATION—CONDITIONS OF REACTION WITH HYDROGEN CHLORIDE GAS

| Resin No | 9 | 10 | 11 | 12 | 13 | 14 | 15 |
|---|---|---|---|---|---|---|---|
| Reaction temperature, °C | (1) | (1) | (1) | (1) | (1) | (1) | (1). |
| Reaction time, minutes | 4 | 22 | 40 | 70 | 95 | 240 | 660. |
| Chlorine content, percent | 0.31 | 1.46 | 1.61 | 3.74 | 6.21 | 11.47 | 13.55. |
| Appearance at room temp | Hard light brown. | Hard light brown. | Hard brown. | Hard brown. | Hard brown. | Semi-fluid dark brown. | Semi-fluid dark brown. |

EVALUATION AS CURING AGENT FOR BUTYL RUBBER

| | | | | | | | |
|---|---|---|---|---|---|---|---|
| Masterbatch, pts | 150.5 | 150.5 | 150.5 | 150.5 | 150.5 | 150.5 | 150.5. |
| Zinc oxide, pts | 5 | 5 | 5 | 5 | 5 | 5 | 5. |
| Resin (above), pts | 12 | 12 | 12 | 12 | 12 | 12 | 12. |
| Mooney scorch at 260 °F., time to 5 pt. rise over minimum, small rotor, minutes | >20 | >20 | >20 | >20 | 1 | 4 | 11. |
| Room temperature physical properties—cured 30 min. at 307 °F.: | | | | | | | |
| Modulus at 200%, p.s.i | | 270 | 300 | 375 | 475 | 410 | 975. |
| Modulus at 300%, p.s.i | 175 | 500 | 500 | 700 | 925 | 860 | 1,525. |
| Tensile strength, p.s.i | 1,180 | 1,950 | 1,950 | 2,065 | 2,090 | 2,160 | 2,040. |
| Elongation at break, percent (2) | 1,040 | 780 | 800 | 710 | 600 | 640 | 450. |
| Goodrich Flexometer test, 100° C. oven, 1800 r.p.m., 0.25 in. stroke, 89 p.s.i. load, 30 min. test duration: | | | | | | | |
| Permanent set, percent | | 17.5 | | | 7.8 | 11.1 | |
| Dynamic drift, percent | (3) | 6.4 | | | 2.3 | 3.9 | |
| Temperature rise, °C | | 36 | | | 29 | 38 | |
| Appearance | | Slightly porous. | | | Excellent | Good | |

(1) Between 24 and 31° C.
(2) Instrument described in ASTM test D-623-52T
(3) Too soft to test.

Again, the data show that the best cures are obtained with a resin containing about 2 to 16 weight percent chlorine; however, for processibility the Mooney data indicate the halogen content should be about 2 to 6 weight percent. Of course, the resins which scorch the butyl may be diluted with non-halogenated resin to bring the halogen content to within the desired range.

EXAMPLE 4

The following example serves to demonstrate a method of preparing the halomethyl phenolic substances without first preparing and isolating the methylol condensation product. In this example the halogenated product is formed in situ in a single step.

A solution of 110 grams of para-nonyl phenol in 100 ml. of petroleum ether was added dropwise over a 30-minute period to an agitated solution consisting of 162 grams of 37% formaldehyde and 30 ml. of concentrated hydrogen chloride acid while keeping the solution saturated with hydrogen chloride gas and chilled to 15° C. Upon completion of the reaction, the hydrocarbon layer was washed three times with an equal volume of water and the petroleum ether solvent was removed by evaporation on a steam bath. The brown colored chloromethyl resin recovered had the consistency of heavy molasses and contained 10.42% chlorine. Twelve parts by weight of the product was compounded with 100 parts by weight of isobutylene-isoprene butyl rubber (GRI-17), 50 parts by weight of MPC carbon black, 0.5 part by weight stearic acid, and 5 parts by weight of zinc oxide. The resulting blend was cured for 60 min. at 320° F. and the vulcanizate formed had the following properties.

Table VI

| | |
|---|---|
| 300% modulus, p.s.i | 550 |
| Tensile at break, p.s.i | 2,030 |
| Elongation at break, percent | 700 |
| Tear (lbs.) | 190 |
| Goodrich Flexometer data at 100° C., 0.25" stroke, 0.25 static compression, 1800 r.p.m.: | |
| Percent permanent set | 10.1 |
| Percent dynamic drift | 3.7 |
| Temperature rise, ° C | 33 |
| Appearance | very good |

The data show that an in situ preparation is a suitable method for preparing these halomethyl phenol curing agents.

EXAMPLE 5

A xylene solution containing 15 wt. percent of polymeric 2,6-dimethylol-5-pentadecyl phenol was reacted with anhydrous gaseous hydrogen chloride at 100° C. for 1 hour. The reaction product was recovered by precipitating with acetone and found to contain 5.16 wt. percent chlorine. Ten parts by weight of the reaction product is blended with 100 parts by weight of 3% isoprene–97% isobutylene butyl rubber and 5 parts by weight of zinc oxide and cured at 320° F. for 60 minutes. The vulcanizate has excellent flexing and physical properties.

EXAMPLE 6

A series of experiments was carried out to define the concentration of halo resin necessary to produce a good cure. The same butyl rubber employed in Example 2 was compounded according to the following formulations.

Table VII

| Recipes | 16 | 17 | 18 | 19 |
|---|---|---|---|---|
| Butyl rubber (GRI-17) | | 100 | | |
| SRF carbon black | | 25 | | |
| HAF carbon black | | 25 | | |
| Stearic acid | | 0.5 | | |
| Zinc oxide | | 5.0 | | |
| Chloro-resin, parts by weight, cured 30' at 152° C | 15 | 10 | 5 | 2 |
| Stress-strain properties: | | | | |
| 200% ext. modulus, p.s.i | 700 | 550 | 375 | <200 |
| 300% ext. modulus, p.s.i | 1,225 | 1,000 | 725 | |
| Tensile at break, p.s.i | 1,970 | 2,090 | 1,990 | <700 |
| Percent elongation | 470 | 610 | 670 | 1,100+ |
| Goodrich Flexometer data, at 100° C., 32 cps., 0.25" stroke, 89 p.s.i. load, 30 min. test: | | | | |
| Percent permanent set | 1.2 | 1.9 | 12.4 | (3) |
| Percent dynamic drift | 0.0 | 0.0 | 4.6 | (3) |
| Temperature rise, ° C | 19 | 21 | 48 | (3) |
| Appearance | (1) | (1) | (2) | (3) |

1 Excellent.
2 Good.
3 Could not be run.

The chloro-resin, which contained 10.16% chlorine, was the same as that used in Example 1. The data show that, under the conditions of the experiment, amounts greater than 2 parts by weight of chloro-resin per 100 parts by weight of butyl rubber are necessary to vulcanize the butyl rubber under relatively mild conditions, while amounts of about 10 to 15 parts by weight are optimum for the production of vulcanizates having excellent stress-strain properties.

Referring now to the drawings, FIGURE 1 depicts a pneumatic tubeless tire which comprises a hollow toroidal type member which is substantially U-shaped in cross-section by virtue of an open portion which extends around the inner periphery of the member. The tire is of a tubeless type structure which has a cross section in the form of an open-bellied body with spaced terminal portions to define a member generally resembling a horseshoe. The terminal portions constitute the bead portions 11—11 of the tire inside of which are a plurality of bead wires adhesively embedded and molded in a rubber. The outer surface of the bead portion is formed into an air-sealing means, such as a plurality of ribs to aid in adhesion to rim 12 when the tire is inflated. The outer surface of the tire also includes tread area 13 and sidewalls 14. The open portion of the hoseshoe-shaped tire faces that portion of the inner circumference of the tire which is adjacent the said tread area of the tire.

The remaining construction of the tire may vary according to conventional fabrication but, in general, the tire is a multi-layered type of structure with an outer layer as above mentioned. The layer next adjacent the outer layer generally comprises a carcass 15 which includes a rubber which has incorporated therein a fabric composed of a plurality of cotton, rayon, steel or nylon cords, etc. The tire also includes an inner lining 16 advantageously made from rubber, e.g., butyl rubber which has been at least partially vulcanized for about 1 to 6 minutes at about 300–400° F. in accordance with the present invention. This inner lining must be substantially impermeable to air. The above multi-layers, at least three in number, are conventionally bonded or otherwise adhered together, e.g., by cementing and/or especially by vulcanizing in the presence of polyhalomethyl phenols according to the invention to form a tire of a unitary structure.

The composition of butyl rubber of the present invention may be employed generally throughout the tire. For example, the inner lining 16 may comprise butyl rubber vulcanized in accordance with the present invention. Alternatively, the inner lining 16 may comprise ordinary butyl rubber which has been bonded to carcass 15 by an interposed tie ply of butyl rubber which has been preferably vulcanized in accordance with the invention. Such an interposed tie ply facilitates the inclusion of highly unsaturated rubbers such as natural rubber, GR–S rubber, Buna–N rubber, mixtures thereof, etc. in the carcass.

The other layers of the tire, such as the intermediate carcass layer and/or outer layer, including the tread area, the sidewall and the outer bead portions, may also comprise butyl rubber vulcanized in accordance with the invention. Vulcanization of the carcass, breaker plies, if any, sidewalls, and tread area is accomplished by heating the same for about 3 to 60 minutes or more at about 250 to 400° F. The butyl rubber compositions of the present invention included in the tire may also contain certain bivalent metal oxides and especially zinc oxide, zinc stearate and/or magnesium oxide.

The tubeless tire may also contain, in at least the tread area 13, an oil-extended high molecular weight (e.g., Staudinger molecular weight of about 70,000 to about 150,000) butyl rubber which has been bonded to a more highly unsaturated rubber in carcass 15 by an interposed tie ply of rubber which has been advantageously vulcanized in the presence of halomethyl hydrocarbon substituted resins and halogenated or ordinary rubber in accordance with the invention.

Figure 2:
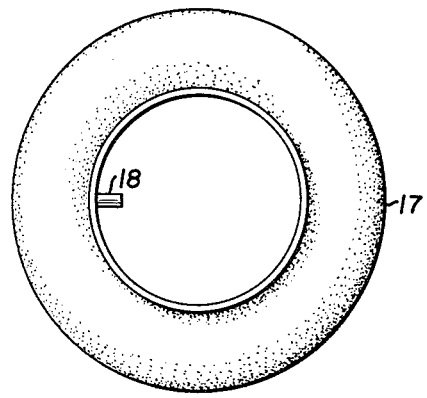
FIGURE 2 is a view in side elevation of a tire casing curing bag.

The combination of advantages realized by the present vulcanization process renders the invention particularly suited for the manufacture of curing bags. In the accompanying drawing, FIGURE 2 illustrates a curing bag made up of a vulcanizate of the invention. A suitable formulation for the curing bag is as follows:

| | Parts by weight |
|---|---|
| Butyl rubber | 100 |
| Zinc oxide | 2–20 |
| Carbon black | 30–80 |
| Stearic acid | 0–5 |
| Halomethyl hydrocarbon-substituted phenol | 2–30 |

The above compound is shaped into the form of the curing bag 17 in accordance with conventional practice and is then cured in a mold at 300 to 360° F. for 20 minutes to 1.5 hours. The curing bag 17 is an annular toroidal form and has an external shape corresponding to the interior contour of the pneumatic tire casing to be cured thereon. It is equipped with the usual connecting stem 18, by means of which a heated fluid under pressure, such as hot water, may be introduced into the interior cavity of the bag during vulcanization of the tire. The bag may thereby be expanded to cause the tire to conform closely to the surfaces of the mold cavity in which the tire is vulcanized.

Non-black fillers, such as silicas or aluminum and calcium silicate, may be used in place of carbon black. The amount of filler used in these articles (curing bags, hoses, etc.) depends on the hardness desired. The resulting curing bag is far superior to conventional curing bags in its resistance to deteriorating influences.

Figure 3:
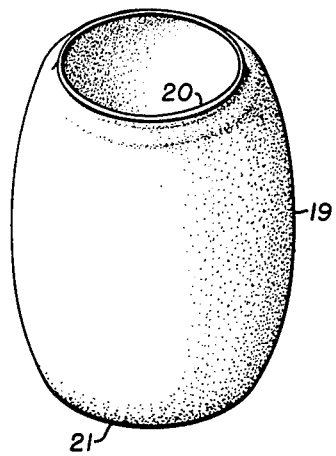
FIGURE 3 is a perspective view of a curing bladder used in "Bag-O-Matic" tire presses.

FIGURE 3 is a hollow cylindrical curing bladder 19 of the type used in Bag-O-Matic tire presses made with butyl rubber vulcanized according to the present invention. The top 20 and bottom 21 of the bladder are sealed when in position on the press by a combination of bead and clamping rings, not shown, which also form the bead area of the tire mold. A Bag-O-Matic tire press is illustrated and described on pages 314 and 318 to 319 in Machinery and Equipment for Rubber and Plastics, vol. I, Primary Machinery & Equipment (1952), compiled by R. G. Seaman and A. M. Merrill.

Another embodiment of the present invention is its use in conveyor belts and steam hoses. The heat resistance properties of butyl rubber vulcanizates prepared according to the present invention make it particularly adaptable for use in steam hoses and conveyor belts where carrying hot materials is involved.

Figure 4:
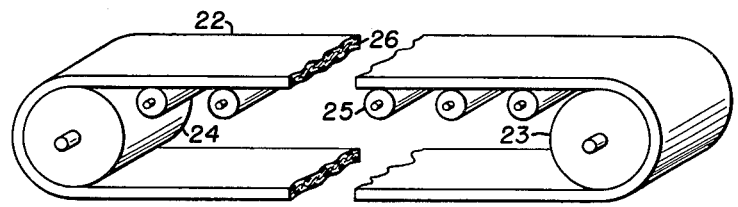
FIGURE 4 is an edgewise perspective view of a conveyor belt.

FIGURE 4 shows a conveyor belt 22, containing butyl rubber cured by means of a halogenated dimethylol phenol resin, in position on a drive roller 23, idle roller 24, and idle roller supports 25. A suitable formula is as follows:

| | Parts by weight |
|---|---|
| Butyl rubber | 100 |
| Zinc oxide | 10 |
| Halomethyl hydrocarbon-substituted phenol | 12 |
| Carbon black | 60 |
| Process oil | 20 |
| Antioxidant | 1 |

The belt may consist wholly of rubber or it may be supported or have embedded within the rubber a fabric 26.

Figure 5:
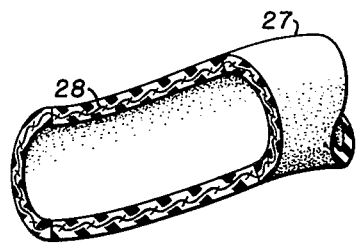
FIGURE 5 is a perspective, partly in section, of a hose.

FIGURE 5 shows a central longitudinal section broken away of a flexible rubber tube 27. A suitable formula for the rubber used in steam hoses is:

| | Parts by weight |
|---|---|
| Butyl rubber | 100 |
| Zinc oxide | 10 |
| Halomethyl hydrocarbon-substituted phenol | 12 |
| Carbon black | 60 |
| Process oil | 20 |
| Antioxidant | 1 |

Again, as in the case of the conveyor belt, the rubber may be supported by a fabric 28.

In the appended claims the expression "butyl rubber"

is intended to mean a rubbery copolymer of about 85–99.5% by wt. of a $C_4$ to $C_7$ isoolefin and about 0.5–15% of a $C_4$ to $C_5$ conjugated diolefin.

Resort may be had to various modifications and variations of the present invention without departing from the spirit or scope of the appended claims.

What is claimed is:

1. A composition comprising 100 parts by weight of butyl rubber copolymer of 85 to 99.5 wt. percent of a $C_4$ to $C_7$ isoolefin and 0.5 to 15 wt. percent of a $C_4$ to $C_{14}$ multiolefin, and about 2 to 30 parts by weight of a polyhalomethyl hydrocarbon-substituted phenol containing a $C_4$ to $C_{14}$ hydrocarbon group in at least one of the meta and para positions.

2. A composition comprising 100 parts by weight of an isobutylene-isoprene butyl rubber containing 0.5 to 5.0 wt. percent of combined isoprene and about 3 to 15 parts by weight of a divalent metal-containing compound selected from the group consisting of group II and IV metal oxides and salts and about 2 to 30 parts by weight of a polyhalomethyl hydrocarbon-substituted phenol resin in which the hydrocarbon substituent is a $C_4$ to $C_{16}$ hydrocarbon in at least one of the meta and para positions and is selected from the group of alkyl, aryl and alkaryl radicals, said resin containing about 1 to 16 wt. percent combined halogen.

3. A method of vulcanizing butyl rubber which comprises mixing a butyl rubber copolymer of 85 to 99.5 wt. percent of a $C_4$ to $C_7$ isoolefin and 15 to 0.5 wt. percent of a $C_4$ to $C_{14}$ multiolefin with a 2,6-dimethylol phenol in which at least a portion of the hydroxy portion of the methylol groups are substituted by halogen so that said phenol contains 1 to 30 wt. percent halogen, said phenol additionally containing a $C_4$ to $C_{16}$ hydrocarbon group in at least one of the meta and para positions, and heating the resulting mixture at a vulcanization temperature for a sufficient time to vulcanize it.

4. A method for vulcanizing isobutylene-isoprene butyl rubber containing about 0.5 to 5.0 wt. percent of combined isoprene which comprises, compounding 100 parts by weight of said butyl rubber with about 1 to 30 parts by weight of a polyvalent metal compound selected from the group of group II and IV metal oxides and salts, and about 2 to 30 parts of a polyhalomethyl hydrocarbon-substituted phenol resin in which the hydrocarbon substituent is in at least one of the meta and para positions and is selected from the group of $C_4$ to $C_{16}$ alkyl, aryl and alkaryl radicals, said resin containing about 1 to 30 wt. percent combined halogen, and heating the compounded butyl rubber for a sufficient time to vulcanize it.

5. A method according to claim 4 in which the resin is formed via a condensation reaction in the presence of a halogenating agent prior to compounding it with the butyl rubber.

6. A method according to claim 4 in which the resin contains about 2 to 16 wt. percent of combined bromine.

7. A vulcanizate having outstanding flexing and stress-strain properties comprising 100 parts by weight of butyl rubber copolymer of 85 to 99.5 wt. percent of a $C_4$ to $C_7$ isoolefin and 15 to 0.5 wt. percent of a $C_4$ to $C_{14}$ multiolefin vulcanized with 2 to 30 parts of a 2,6-dimethylol hydrocarbon-substituted phenol in which at least a portion of the hydroxyl portion of the methylol groups are substituted by halogen and which contains a $C_4$ to $C_{16}$ hydrocarbon group in at least one of the meta and para positions, said phenol containing 1 to 30 wt. percent of halogen in said halogen-substituted methylolic groups.

8. A method according to claim 4 in which the resin contains about 2 to 16 wt. percent of combined chlorine.

9. A method of vulcanizing butyl rubber which comprises mixing 100 parts by weight of an isobutylene-isoprene butyl rubber containing about 0.5 to 5.0 wt. percent of combined isoprene with about 2 to 30 parts by weight of a phenol having a —$CH_2Br$ group in one ortho position, a —$CH_2OH$ group in the other ortho position, and having an alkyl group of 4 to 16 carbon atoms in the para position, and 1 to 30 parts of zinc oxide, and heating the resulting mixture at a vulcanization temperature of about 140 to 400° F. for a sufficient time of about 10 minutes to 2 hours to vulcanize it.

10. A composition comprising 100 parts by weight of an isoolefin-multiolefin butyl rubber containing about 0.5 to 15 wt. percent of combined multiolefin and about 2 to 30 parts by weight of a 2,6-dimethylol phenol in which at least a portion of the hydroxy portion of the methylol groups are substituted by halogen, and containing a hydrocarbon group of 4 to 16 carbon atoms in at least one of the meta and para positions, said phenol containing about 1 to 30 wt. percent halogen in said halogen-substituted methylolic groups.

11. A composition according to claim 10 in which the hydrocarbon group is in the para position.

12. A composition according to claim 10 in which the hydrocarbon group is in the meta position.

References Cited in the file of this patent

UNITED STATES PATENTS

| | | |
|---|---|---|
| 2,403,748 | Olin | July 9, 1946 |
| 2,702,287 | Iknayan et al. | Feb. 15, 1955 |
| 2,726,222 | Palmquist et al. | Dec. 6, 1955 |
| 2,767,156 | Tawney et al. | Oct. 16, 1956 |
| 2,803,620 | Mills | Aug. 30, 1957 |
| 2,857,357 | Smith | Oct. 21, 1958 |
| 2,916,524 | Reese | Dec. 8, 1959 |
| 2,918,448 | Viohl | Dec. 22, 1959 |

OTHER REFERENCES

Van der Meer: "The Vulcanization of Rubber With Phenol Formaldehyde Derivatives," Recueil des Travaux Chimiques, vol. 63, April 1944, pages 147–156, page 152 particularly relied on.